(12) United States Patent
Takahashi (10) Patent No.: US 6,938,736 B2
(45) Date of Patent: Sep. 6, 2005

(54) ELECTRIC PARKING BRAKE MECHANISM

(75) Inventor: Kimio Takahashi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 10/720,148

(22) Filed: Nov. 25, 2003

(65) Prior Publication Data

US 2004/0104087 A1 Jun. 3, 2004

(30) Foreign Application Priority Data

Nov. 26, 2002 (JP) ..................................... P.2002-342033

(51) Int. Cl.⁷ ......................... F16D 65/21; B60T 11/00; B60T 13/74
(52) U.S. Cl. ...................... 188/72.1; 188/156; 188/158; 188/162; 188/72.8; 188/72.7
(58) Field of Search ...................... 76/567–568; 310/77, 310/93; 318/372, 266, 265; 188/82.1, 82.84, 82.5, 265, 82.74, 158, 156, 162, 106 P, 106 R, 71.2, 72.1, 72.8, 72.7, 30–31, 72.3, 216, 60–61; 303/20, 115.2

(56) References Cited

U.S. PATENT DOCUMENTS 5,020,386 A * 6/1991 Taig ............................ 74/384
5,788,340 A * 8/1998 Kobayashi ................ 303/113.1
6,390,247 B1 * 5/2002 Drennen ..................... 188/72.8

FOREIGN PATENT DOCUMENTS

| DE | 10355224 | * 6/2004 |
| JP | 4-108058 | 4/1992 |
| JP | 2000-514540 | 10/2000 |

* cited by examiner

Primary Examiner—Douglas C. Butler
(74) Attorney, Agent, or Firm—Morgan, Lewis & Bockius LLP (57) ABSTRACT

An electric parking brake mechanism characterized in an electric parking brake for pressing a friction member to a braked member via a force transmission converting mechanism for converting a rotational movement of an electric motor to a linear movement, including an input shaft connected to a side of the electric motor, an output shaft connected to a side of a brake mechanism for pressing the friction member to the brake member and a cam mechanism interposed between the input shaft and the output shaft, the cam mechanism is provided with a plurality of cam members and each having a cam face having a radius gradually increasing relative to a rotational center and in driving only a side of the output shaft, rotation of the output shaft is hampered by operating all of the plurality of cam members to constitute sides of large diameters.

6 Claims, 9 Drawing Sheets

ELECTRIC PARKING BRAKE MECHANISM

BACKGROUND OF THE INVENTION

The present invention relates to an electric parking brake mechanism capable of being integrated to an electric brake, particularly relates to an electric parking brake mechanism using an electric motor in an electric brake as a drive source and dispensing with an exclusive actuator.

Conventionally, there have been known various types of electric brakes adopting a mechanism of converting rotational torque of an electric motor into braking force (force transmission converting mechanism) adopting, for example, a ball screw, a roller screw, e ball ramp and the like. In order to enable to use the electric brakes also as parking brakes, a braking force holding mechanism holding braking force (hereinafter, referred to as parking brake mechanism) is needed. There are brake apparatus having such a parking brake mechanism, as described in JP-A-04-108058 (Japanese Patent Application Publication Number: Hei04-108058) and JP-T-2000-514540 (Japanese Patent Application Publication Number: 2000-514540).

An electric brake described in JP-A-108058 is provided with an irreversible mechanism (worm gear) between an electric actuator and a brake mechanism for permitting power transmission only from the electric actuator to the brake mechanism, and is provided with a vehicle state detector for determining a stationary state and a running state of a vehicle, and used as a parking brake by controlling electricity conduction to the electric motor based on an output signal of the vehicle state detector.

Further, a disc brake of an electric type described in JP-T-2000-514540 is a disc brake operated electromechanically for an automobile having a brake caliper, an operating apparatus provided at the brake caliper and two of friction linings provided at the brake calipers to be able to carry out restricted movement by being operated integrally with respective one sides of the brake disc, one of the friction linings is directly engaged with the brake disc via the operating apparatus by an operating member, other of the friction linings is engaged with the brake disc by way of an effect of reaction force by the brake caliper, further, the operating apparatus is provided with an electric motor provided coaxially with the operating member similar to a reduction gear provided between the electric motor and the operating member, and when current supplied to the electric motor is cut after the electric motor has been activated, parking brake operation of constitute by hampering reverse rotation of a rotor of the electric motor by an electromagnet.

However, according to the constitution described in JP-A-04-108058, a reduction gear of a worm gear type is used as the irreversible mechanism and therefore, mechanical efficiency is poor, the electric motor needs to be large-sized in order to sufficiently increase pressing force and it is difficult to downsize a total of the apparatus.

Further, according to a constitution described in JP-T-2000-514540, the actuator (electromagnet) exclusive for the parking brake is needed for operating the parking brake and there poses a problem that a number of parts is increased and downsizing of the apparatus is difficult and so on.

SUMMARY OF THE INVENTION

Therefore, it is an object of the invention to resolve the above-described problem by providing an electric parking brake mechanism capable of holding and releasing a parking brake by a braking force generating motor and capable of preventing a mechanical efficiency from being deteriorated without needing an actuator exclusive for the parking brake.

Therefore, technical resolving means adopted by the invention is an electric parking brake mechanism, for pressing a friction member to a braked member via a force transmission converting mechanism for converting a rotational movement of an electric motor to a linear movement, comprising: an input shaft connected to a side of the electric motor; an output shaft connected to a side of a brake mechanism for pressing the friction member to the braked member, and a cam mechanism interposed between the input shaft and the output shaft, wherein the cam mechanism includes a plurality of cam members each having a cam face a radius of which is gradually increased relative to a rotational center, and when only a side of the output shaft is driven, all of the plurality of cam members are operated to move to sides of large diameters in order to hamper rotation of the output shaft.

Further, the technical resolving means is the electric parking brake mechanism, wherein the cam mechanism comprises a rotating member contained in a nonrotating member having an inner face thereof in a circular shape and rotatable along with the output shaft, a second cam member slidable in a radius direction in the rotating member having an outer face a diameter of which is increased to one side in a peripheral direction, a first cam member disposed on an inner side of the second cam member, having an outer face a diameter of which is increased to other side in the peripheral direction and rotatable along with the input shaft, and a locking member arranged between the second cam member and the nonrotating member.

Further, the technical resolving means is the electric parking brake mechanism, wherein the locking member is urged by an elastic member to a side of a large diameter of the second cam member.

Further, the technical resolving means is the electric parking brake mechanism, wherein the output shaft is arranged to penetrate the input shaft.

Note that in the drawings, reference numeral 1 denotes a caliper, 2 a cylinder, 3 a piston, 4 a dust seal, 5 a ball ramp mechanism, 6 a screw shaft, 7 a ramp plate, 8 a spring seat, 9 a spring, 10 a ball, 11 a nut member, 12 a middle shaft, 13 a second pinion gear, 14 a second wheel gear, 15 a first pinion gear, 16 an output shaft, 17 a first wheel gear, 18 a pinion, 19 a thrust bearing, 20 a parking brake mechanism, 21 a nonrotating member, 22 a rotating member, 23 a groove portion, 24 a noncircular hole, 25 a second cam member, 25A a projection, 26 a recessed portion, 27 a cam face, 28 a locking member, 29 an elastic member, 30 a first cam member, 31 an input shaft, 30B a recessed portion, 30A a through hole, 30C a cam face.

DESCRIPTION OF THE PREFERRED EMBODIMENT

Figure 1:
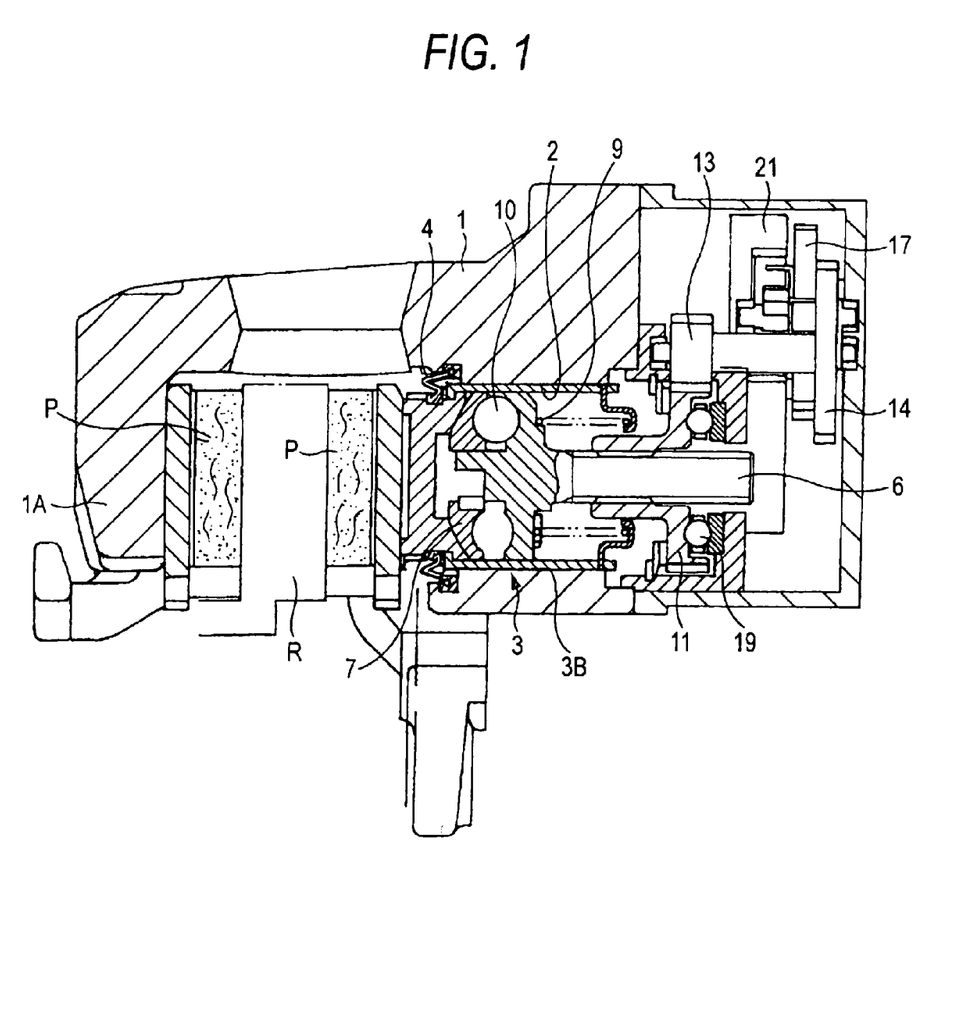
FIG. 1 is a side sectional view of an electric brake according to an embodiment.
Figure 2:
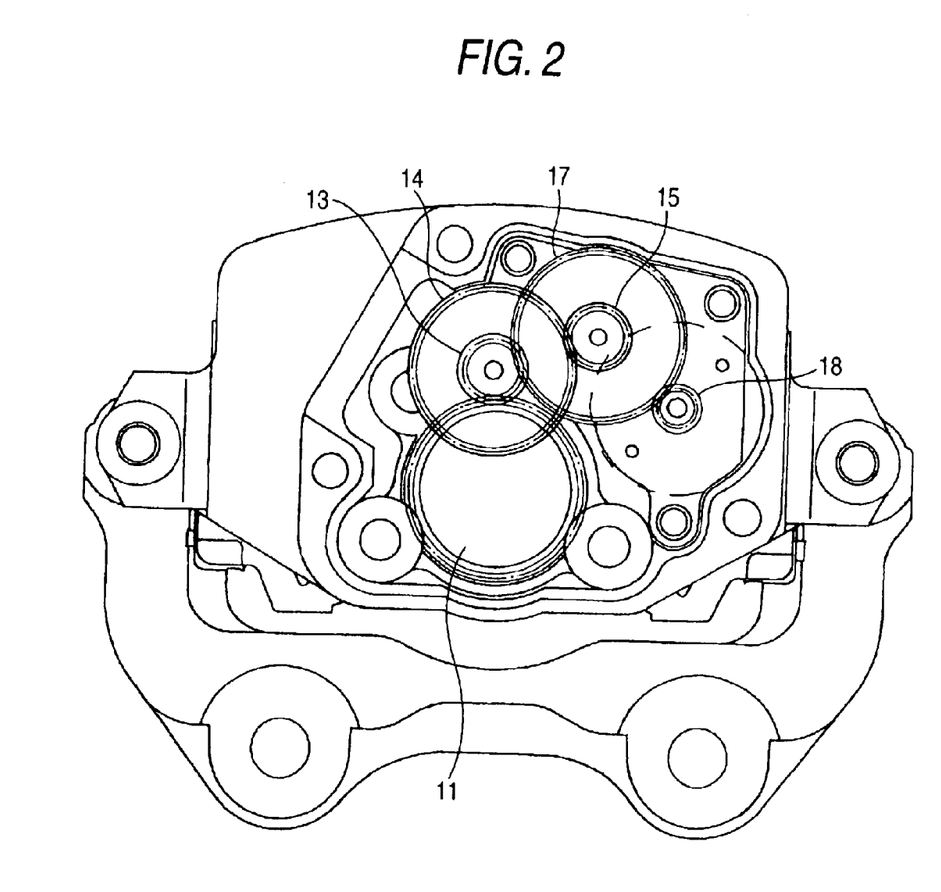
FIG. 2 is a front view of a speed reducing mechanism.
Figure 3:
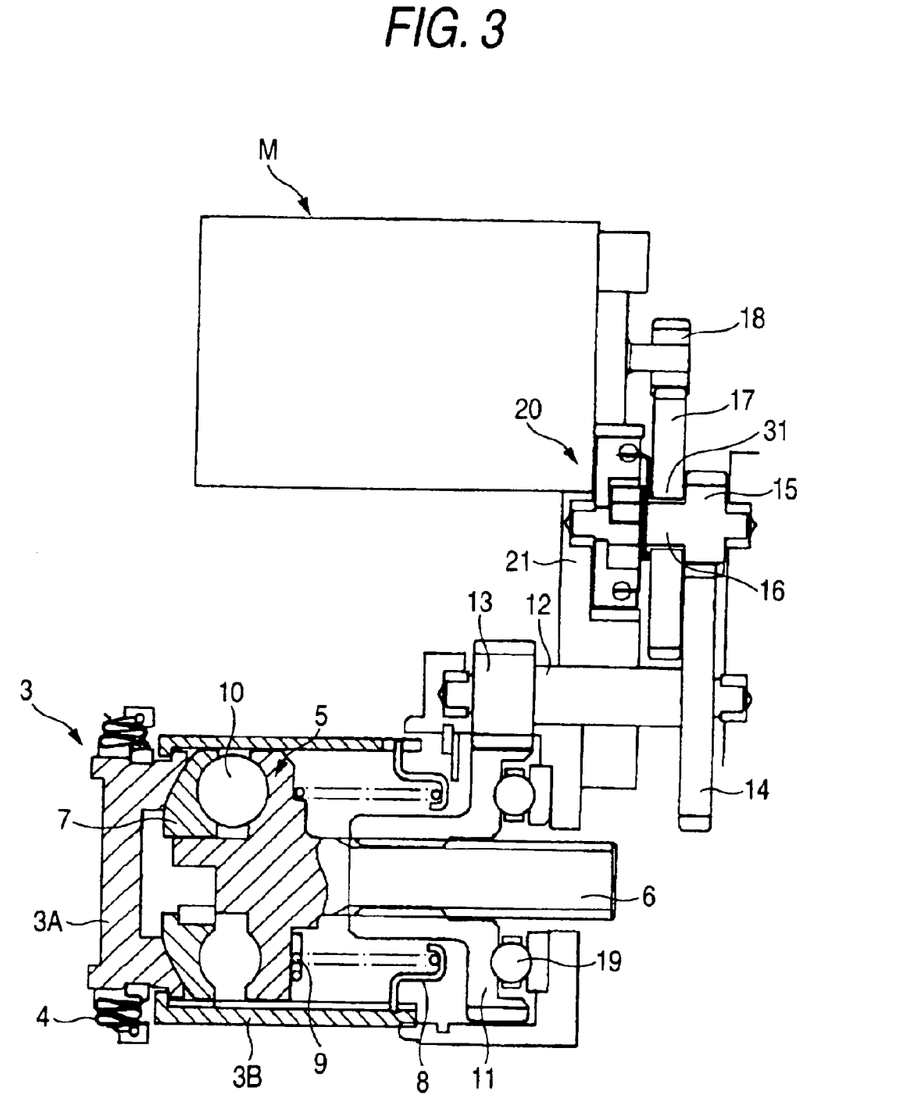
FIG. 3 is a plane view of an electric brake.
Figure 4:
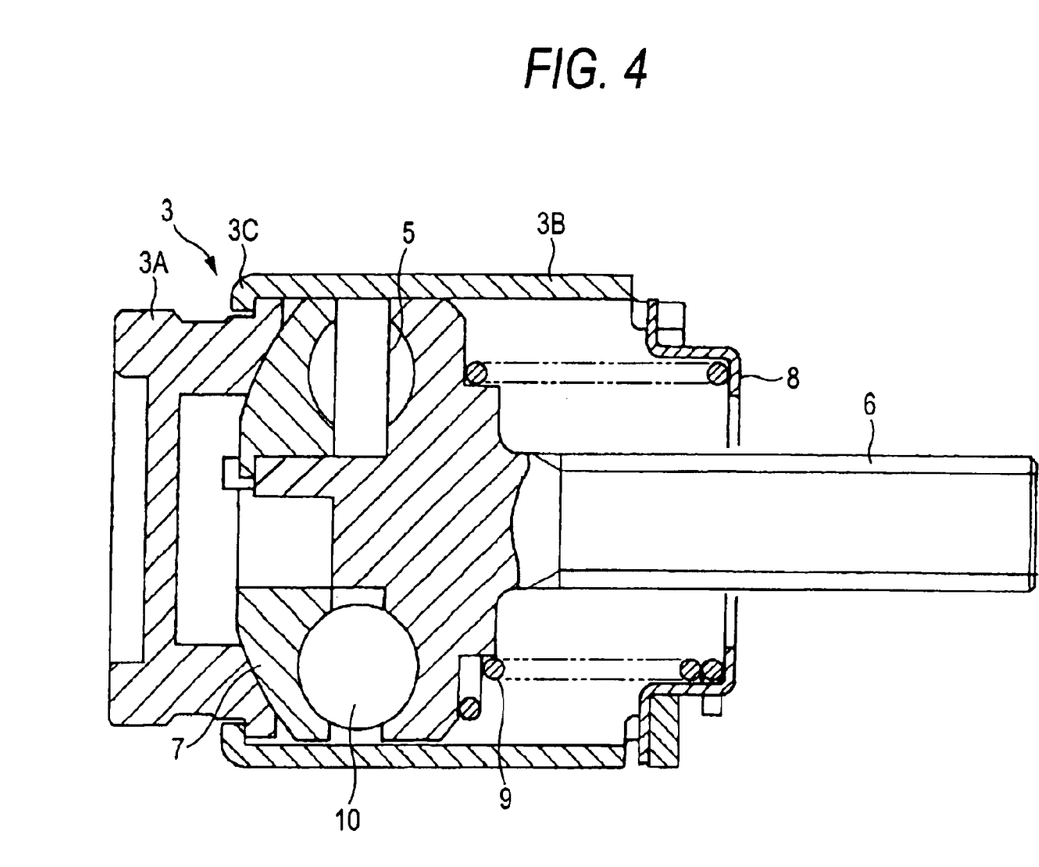
FIG. 4 is an enlarged view of a piston and a force transmission converting mechanism.
Figure 5:
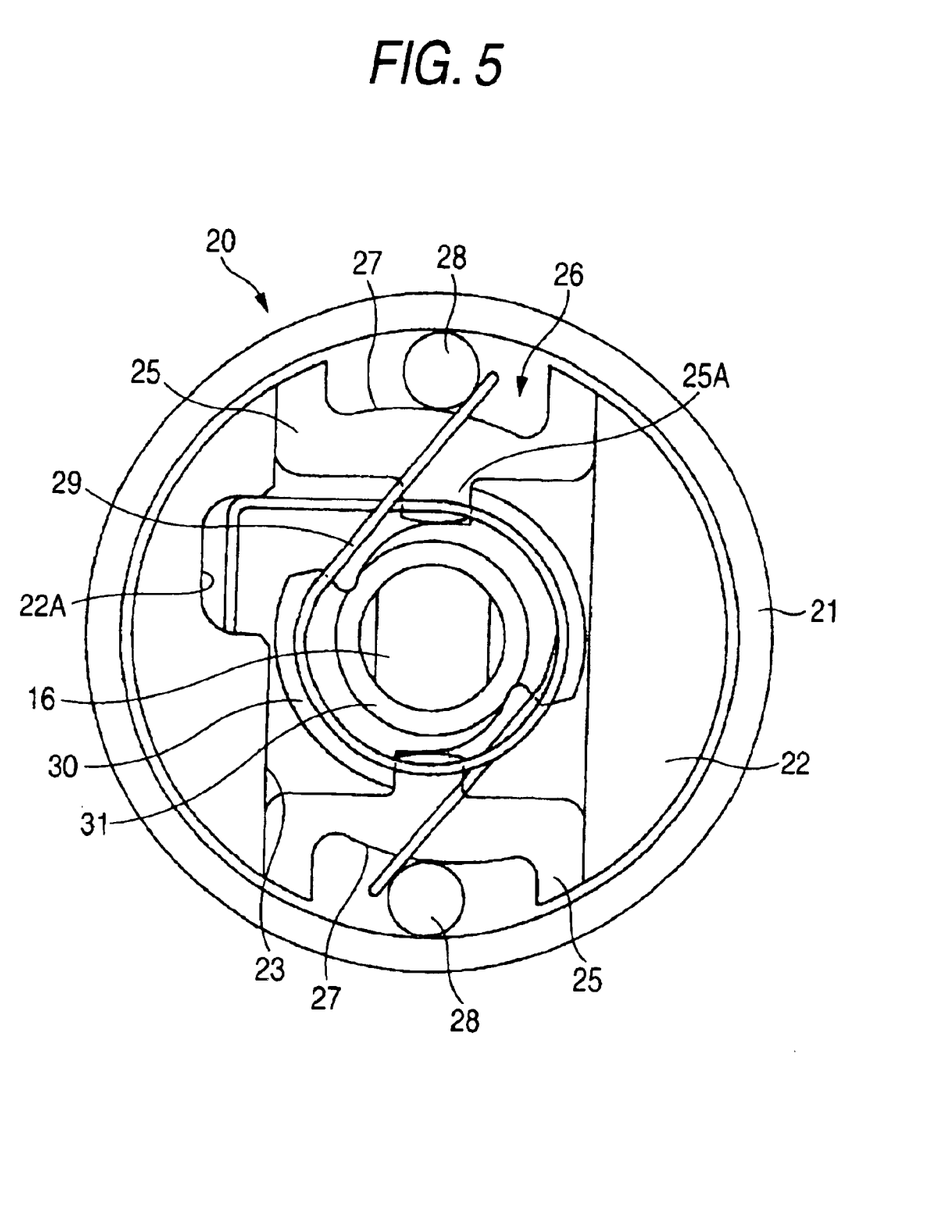
FIG. 5 is a constitution view of an electric parking brake mechanism.
Figure 6:
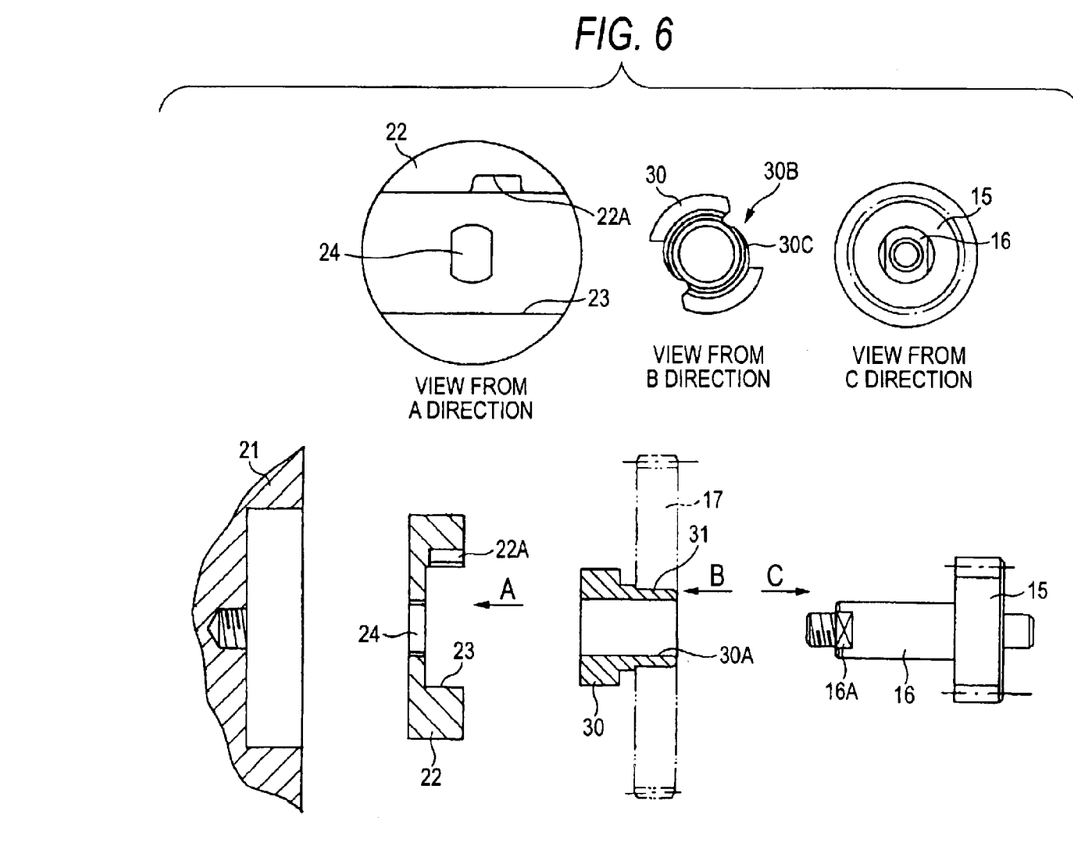
FIG. 6 illustrates a sectional view and a front view of a constituent part of the electric parking brake mechanism.
Figure 7:
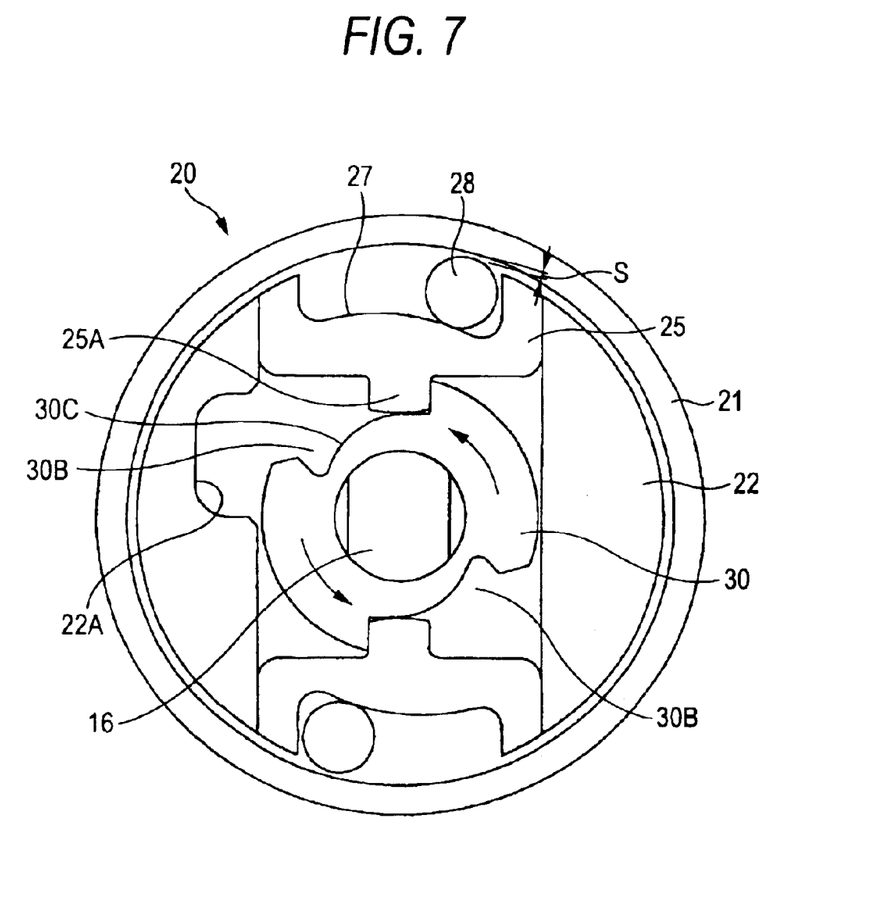
FIG. 7 is a state view of the electric parking brake mechanism in a brake operating state.
Figure 8:
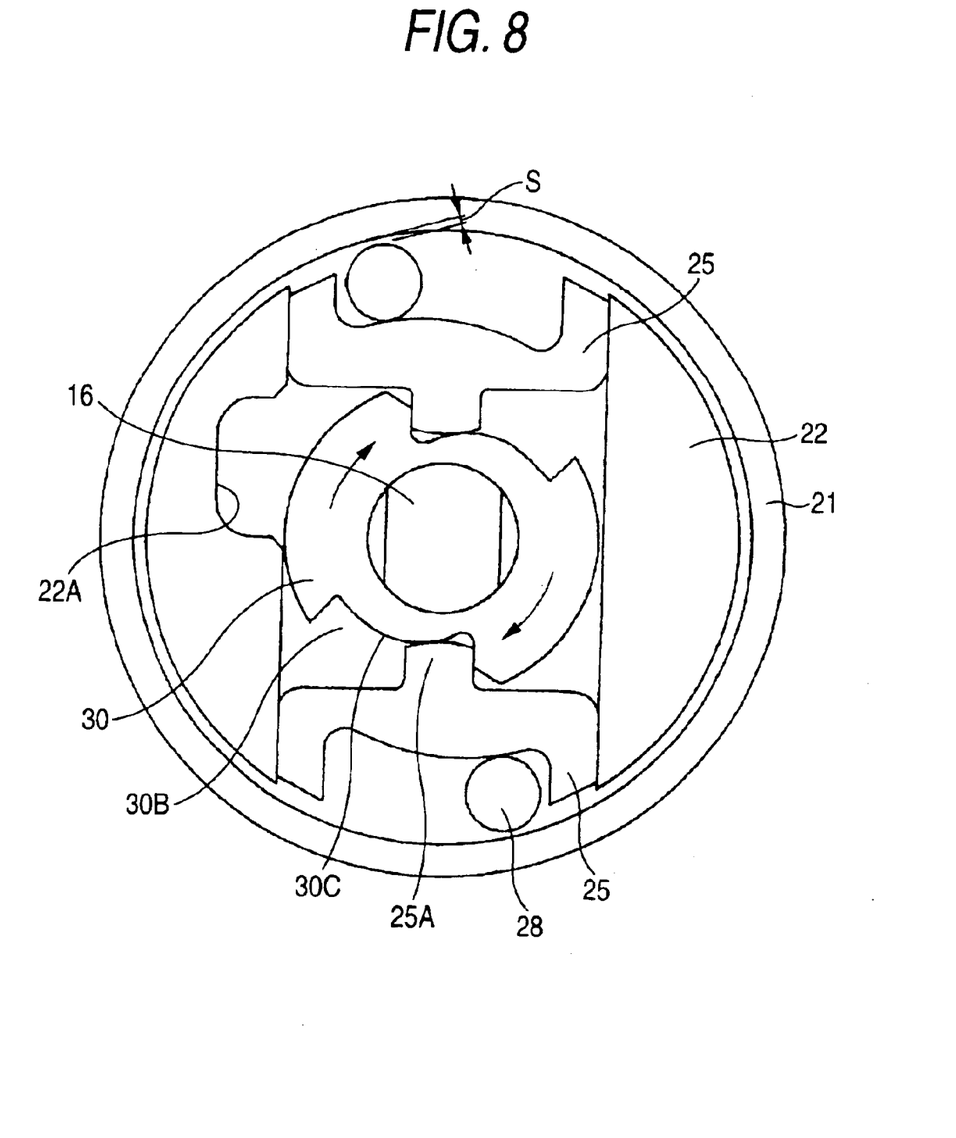
FIG. 8 is a state view of the electric parking brake mechanism in a brake releasing state.
Figure 9:
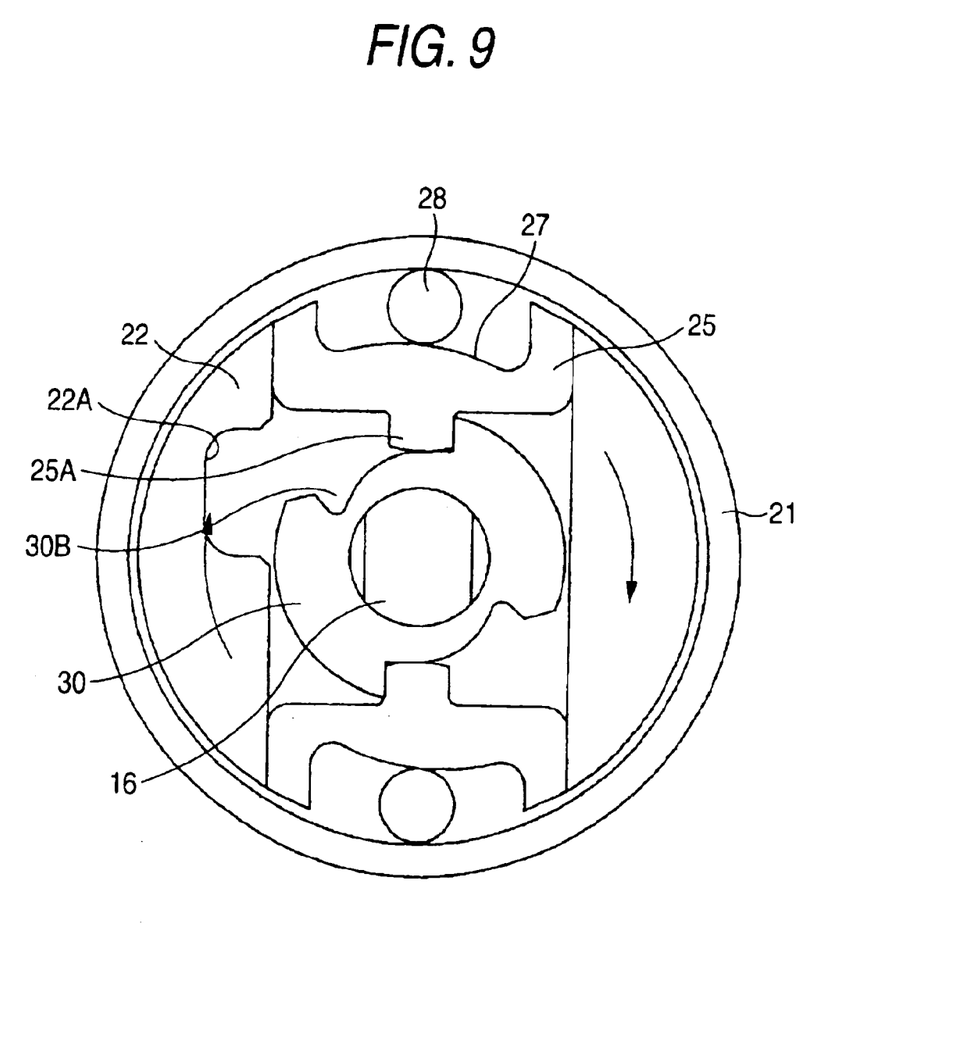
FIG. 9 is a state view of the electric parking brake mechanism in braking by a parking brake.

Explaining an embodiment of the invention in reference to the drawing as follows, FIG. 1 is a side sectional view of an electric brake according to the embodiment, FIG. 2 is a front view of a speed reducing mechanism, FIG. 3 is a plane view of the electric brake, FIG. 4 is an enlarged view of a piston and a force transmission converting mechanism, FIG. 5 is a constitution view of an electric parking brake mechanism, FIG. 6 illustrates a sectional view and a front view of a constituent part of the electric parking brake mechanism, FIG. 7 is a state view of the electric parking brake mechanism in operating a brake, FIG. 8 is a state view of the electric parking brake mechanism in releasing the brake, and FIG. 9 is a state view of the electric parking brake mechanism in operating a parking brake.

In FIG. 1, as is publicly known, an electric brake apparatus is constructed by a constitution having a caliper 1, provided with a brake pad P as a friction member opposed to a brake rotor R which is a braked member between a claw portion 1a of the caliper and a piston 3 and capable of operating braking force by pinching the brake rotor R as the braked member by moving the brake pad P in an axial direction of the brake rotor R.

The piston 3 is nonrotatably and slidably arranged in a cylinder 2 formed at inside of the caliper 1 and a dust seal 4 is arranged between the piston 3 and the cylinder 2.

In FIG. 4, the piston 3 is constructed by a constitution constituted by a piston head 3A and a piston case 3B, arranged with a ball ramp mechanism 5 as a force transmission converting mechanism at inside of the piston 3 and screwing a screw shaft 5 constituting the ball ramp mechanism 5 to a nut member, mentioned later. The piston case is formed with a projection, not illustrated, in an axial direction and by fitting the projection to a recessed portion formed at inside the cylinder, the piston case is nonrotatably and slidably supported by the cylinder. Further, the ball ramp mechanism is constituted by a ramp plate 7 and a disc portion integrally formed with the screw shaft 6 and a ball 10 pinched therebetween.

The piston head 3A is brought into spherical contact with the ramp plate 7 of the ball ramp mechanism 5 and the piston head 3A is constituted to be inclinable to the screw shaft axis. Further, the piston head 3A is engaged with an end portion 3C of the piston case 3B and other end side of the piston case 3B is engaged with a spring 9 arranged between the piston case 3B and the screw shaft 6 via a spring seat 8. By constructing such a constitution, as shown by FIG. 4, the piston head 3A, the piston case 3B and the ball ramp mechanism 5 are integrally assembled by the spring 9 provided between the screw shaft 6 and the spring sheet 8 and the ball ramp mechanism 5 can be prevented from detaching from the piston 3. Further, the above-described ball ramp mechanism 5 is constructed by a constitution similar to that of a ball ramp mechanism of a prior art and therefore, a detailed explanation thereof will be omitted.

In FIG. 2 and FIG. 3, the screw shaft 6 is brought in mesh with a nut member 11 and the nut member 11 is brought in mesh with a second pinion gear 13 provided at a middle shaft 12. The middle shaft 12 is provided with a second wheel gear 14, the second wheel gear 14 is brought in mesh with a first pinion gear 15 and the first pinion gear 15 is fixed to an output shaft 16 constituting a parking brake mechanism 20, mentioned later. The output shaft 16 is connected to a first wheel gear 17 attached to an input shaft (mentioned late) via the parking brake mechanism and the first wheel gear 17 is brought in mesh with the pinion 18 attached to an output shaft of a motor M. Further, notation 19 in the drawing designates a thrust bearing.

Therefore, according to the electric brake comprising the constitution, when the motor M is regularly rotated or reversely rotated, the rotational force is transmitted to the pinion 18→the first wheel gear 17→the input shaft of the parking brake mechanism→the output shaft 16 of the parking brake mechanism→the first pinion gear 15→the second wheel gear 14→the second pinion gear 13→the nut member 11 and the brake can be operated or released by moving the screw shaft 6 in the left or right direction of the drawing. Further, a state of operating or releasing the brake by moving the screw shaft 6 is similar to that in the prior art and is not a characteristic of the invention and therefore, a detailed explanation thereof will be omitted.

An explanation will be given of details of the electric parking brake mechanism 20 as follows.
<Electric Parking Brake Mechanism>

In FIG. 5 and FIG. 6, the electric parking brake mechanism 20 is provided with a nonrotating member 21 and is provided with a rotating member 22 rotatably contained in the nonrotating member 21. As shown by FIG. 5 and FIG. 6, the rotating member 22 is formed with a groove portion 23 passing a rotational center of the rotating member 22 and at a central portion of the groove portion 23, an end portion 16A of the output shaft 16 is attached nonrotatably to a noncircular hole 24 formed at the center of the groove portion. Further, as described above, the first pinion gear 15 is nonrotatably attached to the output shaft 16. As shown by FIG. 5, the groove portion 23 is arranged slidably with two pieces of second cam members 25 constituting a cam mechanism. A recessed portion 26 is formed on an outer side of the second cam member 25 and a bottom face of the recessed portion 26 is formed as a cam face 27. The cam face 27 is constituted by a shape in which a radius thereof is gradually increased relative to a rotational center of the rotating member 22 and a distance between the cam face 27 and the nonrotating member is gradually changed from small to large and a locking member (hereinafter, referred to as ball) 28 is arranged between the cam face 27 and the nonrotating member 21. Further, the ball 28 is constituted to be urged to a large diameter side of the second cam member 25 by an elastic member (hereinafter, referred to as spring) 29 as shown by FIG. 5. The spring 29 is constituted by a coil-like shape, one end thereof is engaged with an engaging portion 22A of the rotating member 22 and other end thereof is locked to the ball 28. Further, a projection 25A for engaging with a first cam member 30 constituting a cam mechanism, mentioned later, is formed at a center of an inner side of the second cam member 25.

The first cam member 30 is arranged at a center of the groove portion of the rotating member 22, a central portion of the first cam member 30 is formed with a through hole 30A which can be penetrated by the above-described output shaft 16, an input shaft 31 is formed integrally with the first cam member 30 and the input shaft 31 is attached with the above-described first wheel gear 17 nonrotatably to each other as shown by FIG. 6. The first cam member 30 is provided with two pieces of recessed portions 30B at an outer periphery thereof (refer to FIG. 6) and bottom faces of the recessed portions 30B constitute cam faces 30C is in point symmetry. There is constructed a constitution an which the cam face 30C in a shape of gradually increasing a radius thereof, the above-described projection 25A of the second cam member 25 is inserted into the recessed portion 30B and the projection 25A and the first cam member 30 can be engaged with each other by the recessed portion 30B.

<Operation of Electric Parking Brake Mechanism>

According to the electric parking brake mechanism constructed by the above-described constitution, when the electric motor is operated and the pinion 18→the first wheel gear 17 are rotated, the input shaft 31 coupled with the first wheel gear 17 is rotated in a brake operating direction and the first cam member 30 is rotated integrally therewith (refer to FIG. 7). As a result, the recessed portion 30B of the first cam member 30 and the projection 25A of the second cam member 25 are engaged with each other and the second cam member 25 is rotated integrally with the first cam member 30. At this occasion, in the first cam member 30, a portion of the cam face 30C having a large radius is brought into contact with a bottom face of the projection 25A of the second member 25, further, in the second cam member 25, the ball 28 is moved to a portion of the cam face 27 having a small radius and therefore, a clearance S is produced between the ball 28 and the nonrotating member 21. Therefore, both of the first cam member 30 and the second cam member 25 are rotated in an arrow mark direction shown in FIG. 7, further, the rotating member 22 slidably arranged with the second cam member 25 is also rotated in the same direction, the output shaft 16 and the first pinion gear coupled with the rotating member 22 are also rotated, rotation is transmitted to the first pinion gear 15→the second wheel gear 16→the second pinion gear 13→the nut member 11 and the brake can be operated by moving the screw shaft 6 in the left direction of the drawing.

Further, when the motor is rotated reversely and the input shaft 31 is rotated in a direction reverse to the above-described (brake releasing direction, refer to FIG. 8) the recessed portion 30B of the first cam member 30 and the projection 25A of the second cam member 25 are engaged with each other on a side opposed to that in the above-described case and the second cam member 25 is rotated integrally with the first cam member 30. At this occasion, in the second cam member 25, the ball 28 is moved to a side of the cam face having a large radius. However, in the first cam member 30, a portion of the came face 30C having a small radius is brought into contact with the projection 25A of the second cam member 25 and therefore, the clearance S is produced between the ball 28 and the nonrotating member 21. Therefore, both of the first cam member 30 and the second cam member 25 are rotated in an arrow mark direction shown in FIG. 8. Further, the rotating member 22 slidably arranged with the second cam member 25 is also rotated in the same direction, the output shaft 16 and the first pinion gear 15 coupled with the rotating member 22 are also rotated, the rotation is transmitted to the pinion gear 15→the second wheel gear 16→the second pinion gear 13→the nut member 11 and the brake can be released by moving the screw shaft 6 in the right direction of the drawing.

Further, in the case in which the input shaft 31 is brought into a nonrotating state (the motor is brought into a stationary state), when the output shaft 16 is rotated in an arrow mark direction of FIG. 9 (that is, when the output shaft is rotated by a force of returning the piston) the rotating member 22 coupled with the output shaft 16 is rotated in the direction shown in FIG. 9, the second cam member 25 is brought into contact with a cam face of the first cam member 30 having a large radius. Further, the ball 28 arranged between the second cam member 25 and the nonrotating member 21 is also moved to a cam face of the second cam member 25 having a large radius and therefore, the ball 28 is pinched between the second cam member 25 and the nonrotating member 21 (in other words, by a wedge effect in which the ball is driven to climb the cam face) to thereby enable to bring about a parking brake state. Further, in releasing the parking brake state, the brake can be released by reversely rotating the motor M.

As described above, according to the invention, by integrating the electric parking brake mechanism into the electric brake, the actuator exclusive for the parking brake can be dispensed with, and the parking brake can be held and released by the electric motor for generating the braking force. Further, as the force transmission converting mechanism, in place of the ball ramp mechanism as in the above-described embodiment, various mechanisms capable of converting rotational movement to linear movement of a ball screw, a roller screw or the like can be adopted. Further, also the constitution of the piston is not limited to the above-described constitution but a piston of a conventional type integrated with a piston and a piston case can be used. Further, also the locking member arranged at inside of the electric parking brake mechanism is not limited to the ball but a rotating member in the shape of a roller can also be used therefor. Further, also as a location of arranging the electric parking brake mechanism, a pertinent location can be selected in designing so far as the location is between the motor and the force transmission converting mechanism and the input shaft can also be connected directly to the electric motor.

As has been described in details, according to the invention, by constituting the electric parking brake mechanism by the input shaft connected to the side of the motor, the output shaft connected to the side of the brake mechanism and the cam mechanism for coupling the input shaft and the output shaft in regularly rotating and reversely rotating to drive the input shaft and fixing the output shaft in a nonrotating state in driving the side of the output shaft in a state of stopping the side of the input shaft, the mechanical efficiency can be promoted and a total of the apparatus can be downsized in comparison with the parking brake mechanism of the conventional art adopting the irreversible mechanism of the worm gear type. Further, since the cam mechanism is adopted as electric parking brake mechanism, durability can be ensured and safety in operation can be ensured. Further, since an actuator exclusive for a parking brake is not used, and the parking brake is held and released by the electric motor for generating the force, excellent effects of enabling to simplify the constitution of the electric brake and so on can be achieved.

What is claimed is:

1. An electric parking brake mechanism, for pressing a friction member to a braked member via a force transmission converting mechanism for converting a rotational movement of an electric motor to a linear movement, comprising:

an input shaft connected to a side of the electric motor;
an output shaft connected to a side of the brake mechanism for pressing the friction member to the braked member, and
a cam mechanism interposed between the input shaft and the output shaft,
wherein the cam mechanism includes a plurality of cam members each having a cam face a radius of which is gradually increased relative to a rotational center, the parking brake mechanism having a configuration wherein the input shaft is not driven by the electric motor, the output shaft is driven by a force from the friction member, and all of the plurality of cam members have been operated to move to sides of large diameters to hamper rotation of the output shaft.

2. An electric parking brake mechanism, for pressing a friction member to a braked member via a force transmission converting mechanism for converting a rotational movement of an electric motor to a linear movement, comprising:

an input shaft connected to a side of the electric motor;

an output shaft connected to a side of the brake mechanism for pressing the friction member to the braked member, and a cam mechanism interposed between the input shaft and the output shaft, wherein the cam mechanism includes:

a rotating member contained in a nonrotating member having a circular-shaped inner face, rotatable along with the output shaft;

a second cam member slidable in a radius direction in the rotating member, having an outer face a diameter of which is increased to one side in a peripheral direction, a first cam member disposed on an inner side of the second cam member, having an outer face a diameter of which is increased to other side in the peripheral direction, rotatable along with the input shaft, and a locking member arranged between the second cam member and the nonrotating member.

3. The electric parking brake mechanism according to claim 2, wherein the locking member is urged by an elastic member to a side of a large diameter of the second cam member.

4. The electric parking brake mechanism according to claim 1, wherein the output shaft is arranged to penetrate the input shaft.

5. The electric parking brake mechanism according to claim 2, wherein the output shaft is arranged to penetrate the input shaft.

6. The electric parking brake mechanism according to claim 3, wherein the output shaft is arranged to penetrate the input shaft.

* * * * *